(12) United States Patent
Lundeen

(10) Patent No.: US 10,671,357 B2
(45) Date of Patent: Jun. 2, 2020

(54) PREVIEW CHANGES TO MOBILE APPLICATIONS AT DIFFERENT DISPLAY RESOLUTIONS

(71) Applicant: Apptimize LLC, San Francisco, CA (US)

(72) Inventor: Timothy D. Lundeen, San Francisco, CA (US)

(73) Assignee: Apptimize LLC, San Francisco, CA (US)

( * ) Notice: Subject to any disclaimer, the term of this patent is extended or adjusted under 35 U.S.C. 154(b) by 0 days.

(21) Appl. No.: 16/000,434

(22) Filed: Jun. 5, 2018

(65) Prior Publication Data

US 2018/0349107 A1    Dec. 6, 2018

Related U.S. Application Data

(60) Provisional application No. 62/515,328, filed on Jun. 5, 2017.

(51) Int. Cl.
| | | |
|---|---|---|
| *G06F 9/44* | (2018.01) | |
| *G06F 8/34* | (2018.01) | |
| *G06F 3/0484* | (2013.01) | |
| *H04M 1/725* | (2006.01) | |
| *G06F 8/38* | (2018.01) | |
| *H04M 1/24* | (2006.01) | |

(52) U.S. Cl.
CPC ............ *G06F 8/34* (2013.01); *G06F 3/04845* (2013.01); *G06F 8/38* (2013.01); *H04M 1/72522* (2013.01); *H04M 1/24* (2013.01); *H04M 1/72525* (2013.01); *H04M 1/72552* (2013.01)

(58) Field of Classification Search
CPC ................. G06F 8/34; G06F 8/35; G06F 8/20
USPC .................................................. 717/104–113
See application file for complete search history.

(56) References Cited

U.S. PATENT DOCUMENTS

| | | | |
|---|---|---|---|
| 6,370,573 B1 * | 4/2002 | Bowman-Amuah | G06F 8/20 709/223 |
| 6,401,085 B1 * | 6/2002 | Gershman | G06Q 50/22 |
| 6,405,366 B1 * | 6/2002 | Lorenz, Sr. | G06F 8/36 717/107 |

(Continued)

OTHER PUBLICATIONS

Jose et al, "Mobile Applications for Open Display Networks: Common Design Considerations", ACM, pp. 97-102 (Year: 2013).*

(Continued)

*Primary Examiner* — Anil Khatri
(74) *Attorney, Agent, or Firm* — Fenwick & West LLP

(57) ABSTRACT

Techniques to facilitate previewing changes to visual elements of a mobile application at different display sizes are disclosed herein. In at least one implementation, screenshot capture instructions provided by an application development and optimization platform are received that indicate at least one requested display size at which to provide a view of the mobile application. An actual screenshot of the view of the mobile application is captured, and a virtual screenshot of the view is rendered by resizing the actual screenshot to the requested display size indicated in the screenshot capture instructions. The actual screenshot of the view and the virtual screenshot of the view rendered at the requested display size are transferred for delivery to the application development and optimization platform.

14 Claims, 8 Drawing Sheets

(56) References Cited

U.S. PATENT DOCUMENTS

| | | | | |
|---|---|---|---|---|
| 7,360,202 | B1* | 4/2008 | Seshadri | H04L 12/1859 |
| | | | | 717/106 |
| 7,624,370 | B2* | 11/2009 | Bibr | G06F 9/44526 |
| | | | | 709/219 |
| 7,958,488 | B2* | 6/2011 | Cifra | G01R 31/318357 |
| | | | | 717/106 |
| 8,108,830 | B2* | 1/2012 | Bibr | G06F 8/65 |
| | | | | 717/107 |
| 8,239,840 | B1* | 8/2012 | Czymontek | G06F 8/34 |
| | | | | 717/125 |
| 8,296,445 | B1* | 10/2012 | Hackborn | G06F 11/3664 |
| | | | | 709/228 |
| 8,701,084 | B1* | 4/2014 | MacDonald | G06F 8/71 |
| | | | | 717/113 |
| 8,819,630 | B2* | 8/2014 | Chen | G06F 16/9577 |
| | | | | 717/124 |
| 8,843,920 | B2* | 9/2014 | Frost | G06F 9/44521 |
| | | | | 715/223 |
| 8,856,748 | B1* | 10/2014 | Larsen | G06F 11/3668 |
| | | | | 717/125 |
| 8,865,748 | B2* | 10/2014 | Shalwitz | A61K 31/4418 |
| | | | | 514/350 |
| 9,154,611 | B1* | 10/2015 | Jackson | H04W 4/029 |
| 9,372,672 | B1* | 6/2016 | Thomas | G06F 9/454 |
| 9,454,363 | B1* | 9/2016 | Angell | G06F 8/65 |
| 9,579,586 | B2* | 2/2017 | Bear | H04N 5/445 |
| 9,645,910 | B1* | 5/2017 | Kaila | G06F 11/3624 |
| 9,652,364 | B1* | 5/2017 | Kaila | G06F 11/366 |
| 9,679,404 | B2* | 6/2017 | Douglas | G06F 3/0481 |
| 10,235,280 | B2* | 3/2019 | Dougherty | G06F 11/3688 |
| 10,324,828 | B2* | 6/2019 | Shtuchkin | G06F 11/3688 |
| 10,386,960 | B1* | 8/2019 | Smith | G06F 3/0416 |
| 10,425,445 | B2* | 9/2019 | Belikovetsky | H04W 12/12 |
| 10,430,458 | B2* | 10/2019 | Lahmann | G06F 16/5838 |
| 10,515,615 | B2* | 12/2019 | Elkins | G10H 1/0025 |
| 10,534,844 | B2* | 1/2020 | Cochrane | G06F 40/137 |
| 2005/0285878 | A1* | 12/2005 | Singh | H04M 1/72544 |
| | | | | 345/633 |
| 2007/0099659 | A1* | 5/2007 | Borquez | G06F 8/20 |
| | | | | 455/556.2 |

OTHER PUBLICATIONS

Karlson et al, "Mobile Taskflow in Context: A Screenshot Study of Smartphone Usage", ACM, pp. 2009-2018 (Year: 2010).*
Salam et al, "Automated Testing of Java Menu-Based GUIs Using XML Visual Editor", IEEE, pp. 1-6 (Year: 2007).*
Henard et al, "Pledge: A Product Line Editor and Test Generation Tool", ACM, pp. 126-129 (Year: 2013).*
Holzmann et al, "Multivariate Testing of Native Mobile Applications", ACM, pp. 1-10 (Year: 2014).*
Ridene et al, "A DSML for Mobile Phone Applications Testing", ACM, pp. 1-6 (Year: 2010).*
Chmielewski et al, "Application Architectures for Smart Multi-Device Applications", ACM, pp. 1-5 (Year: 2012).*
Barraza et al, "A Mobile Augmented Reality Framework Based on Reusable Components", IEEE, pp. 713-720 (Year: 2015).*

* cited by examiner

PREVIEW CHANGES TO MOBILE APPLICATIONS AT DIFFERENT DISPLAY RESOLUTIONS

RELATED APPLICATIONS

This application claims the benefit of, and priority to, U.S. Provisional Patent Application No. 62/515,328, entitled "PREVIEW CHANGES TO MOBILE APPLICATIONS AT DIFFERENT DISPLAY RESOLUTIONS" filed Jun. 5, 2017, which is hereby incorporated by reference in its entirety for all purposes.

TECHNICAL BACKGROUND

Modern computing systems such as smartphones, tablets, and other mobile devices enable users to install and run various applications. These mobile applications typically provide a wide range of functionality, such as streaming video, social networking, games, email, instant messaging, weather, navigation, or any other mobile application. An application may be referred to as "native" when the application program code has been developed for use on a particular platform or operating system. However, even a native application may display differently depending on the display size and resolution of the device on which the application is executing. For example, laptop and tablet computers typically have larger display screen sizes and accommodate higher display resolutions than a smartphone.

Application developers commonly desire to test an application on several different devices to see how the various display screens and visual layout of the application will appear at different display resolutions. For example, developers want to ensure that changes made to a display layout or other visual elements of an application will render properly for display on common screen sizes of popular devices. Unfortunately, verifying how the application will look at these different display resolutions often requires testing the application on each device individually, which can be very inefficient and time consuming.

Overview

Provided herein are techniques to facilitate previewing changes to visual elements of a mobile application at different display sizes. In at least one implementation, screenshot capture instructions provided by an application development and optimization platform are received that indicate at least one requested display size at which to provide a view of the mobile application. An actual screenshot of the view of the mobile application is captured, and a virtual screenshot of the view is rendered by resizing the actual screenshot to the requested display size indicated in the screenshot capture instructions. The actual screenshot of the view and the virtual screenshot of the view rendered at the requested display size are transferred for delivery to the application development and optimization platform.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

Figure 1:
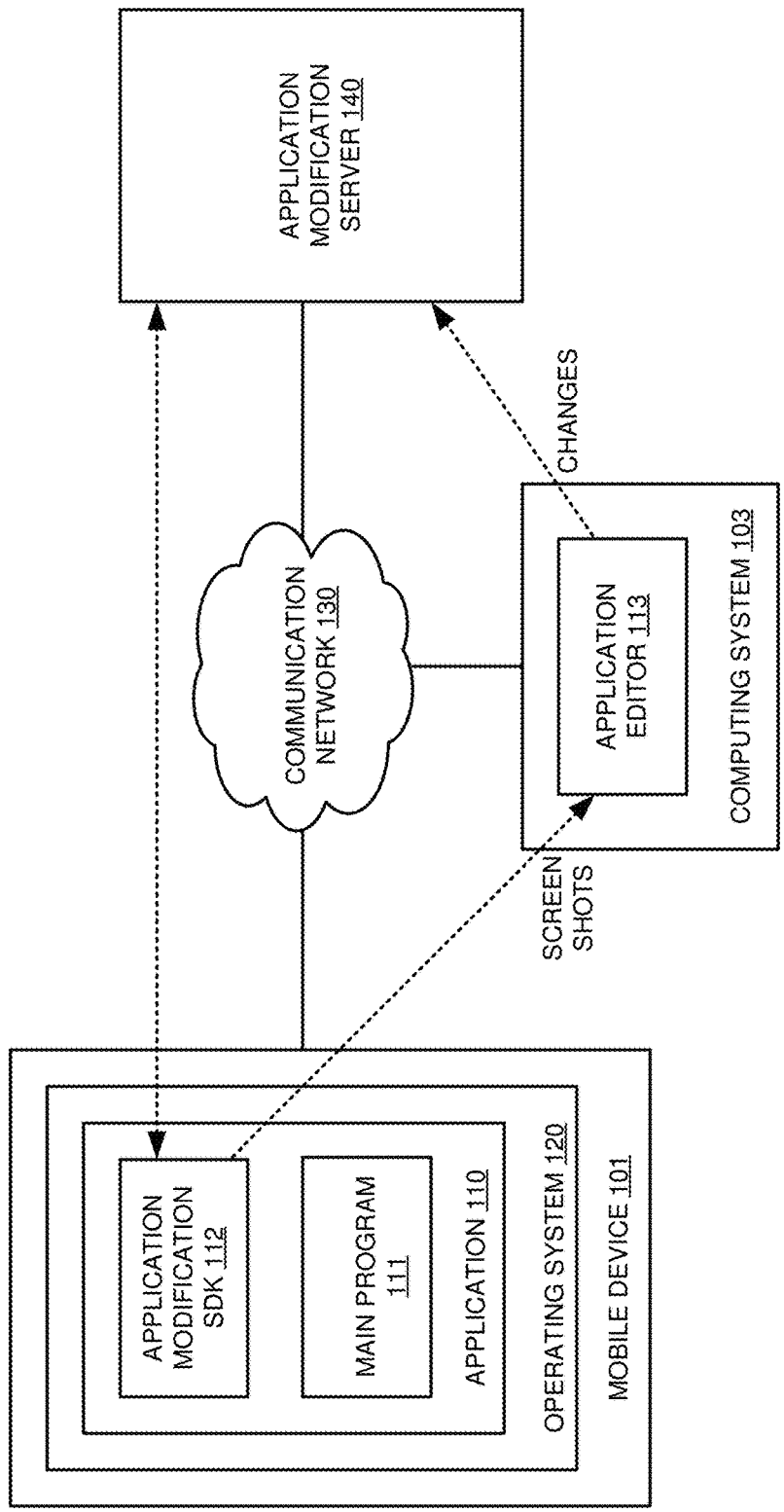
FIG. 1 is a block diagram that illustrates a communication system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Mobile application designers often desire to make changes and updates to visual elements and other aspects of the user interface of an application. Ordinarily, such changes would require the application developers to edit program code to implement the new application design requirements. However, a framework can be installed into a mobile application which can receive and interpret changes to visual properties of display elements, providing a quick and easy way for designers to edit the user interface of a mobile application without having to write any programming code. Such changes and new features can then be tested on subsets of the user base using various techniques such as A/B testing, staged rollouts, and feature toggling. In addition, this same framework can provide screenshots of various views of an application for display in a visual application editor utilized by the application developer. For example, the framework may utilize a software development kit (SDK) installed into the mobile application that sends information about the user interface of the application to a remote computing system operated by the developer, including the entire view hierarchy of the mobile application, all of the views that exist in the current user interface of the application, and screenshots of these views for display within the visual editor executing on the developer's computing system. In this manner, the view hierarchy of the mobile application can be displayed as images on the screen within the visual editor and also as a tree structure in the margin to enable the developer to navigate through the elements within the view hierarchy. However, in addition to providing actual screenshots of the various views of the mobile application as displayed on that particular device, the SDK installed in the mobile application can also provide "virtual" screenshots rendered at any other resolutions desired by the developer. These virtual screenshots can then be displayed in the visual editor to enable the developer to view changes to visual elements of an application at multiple screen resolutions simultaneously in real time. The following disclosure provides various techniques for previewing modifications to visual elements of mobile applications at different display resolutions.

Systems, methods, and software are disclosed herein that enhance application development and software design-for-test (DFT) technology utilizing an application development and optimization platform to facilitate previewing modifications to visual elements of mobile applications at different display resolutions. Among other benefits, the techniques described herein provide application developers the ability to utilize a visual application editor to display changes to visual elements of an application at multiple screen resolutions simultaneously in real time.

Figure 2:
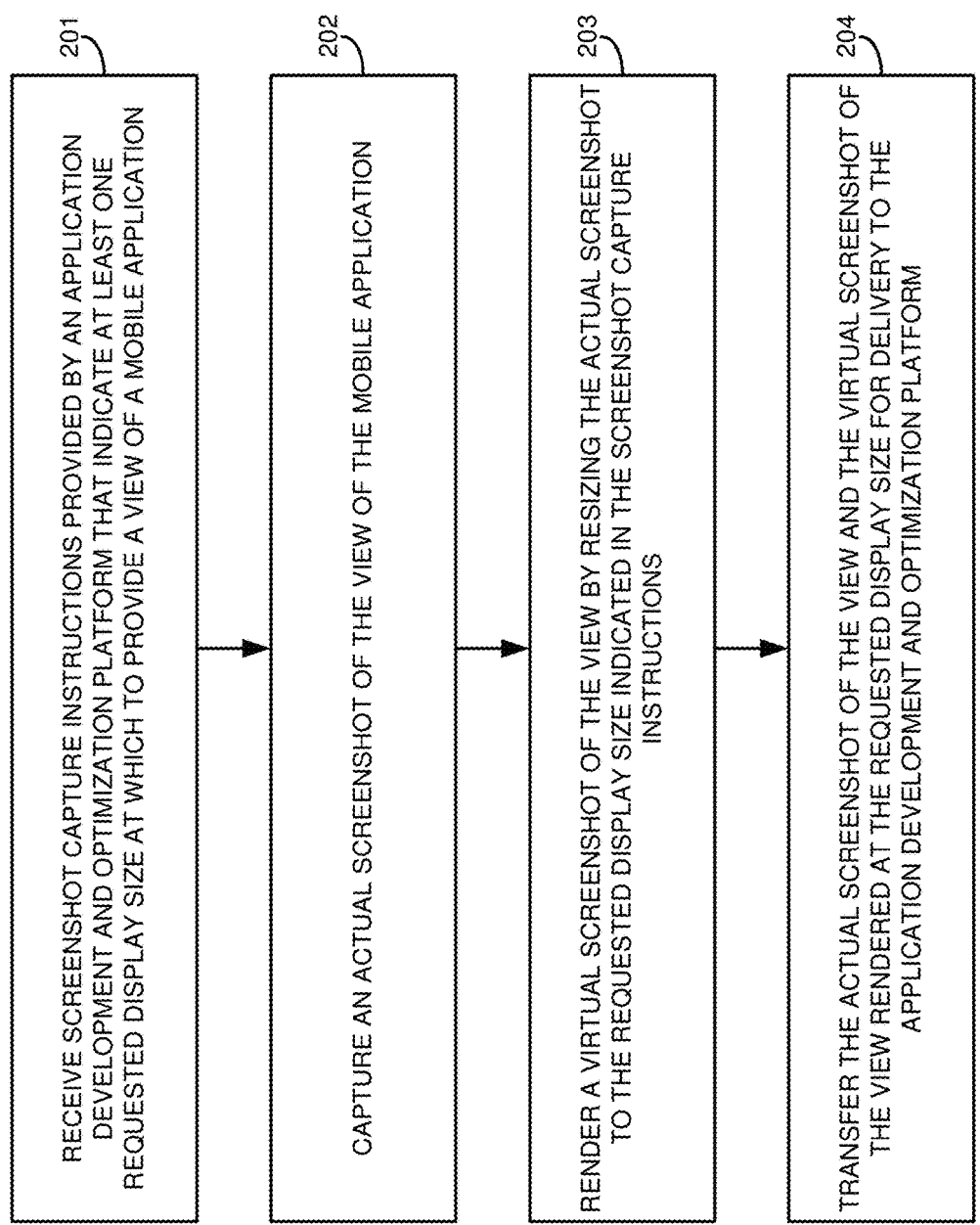
FIG. 2 is a flow diagram that illustrates an operation of a communication system in an exemplary embodiment.
Figure 3:
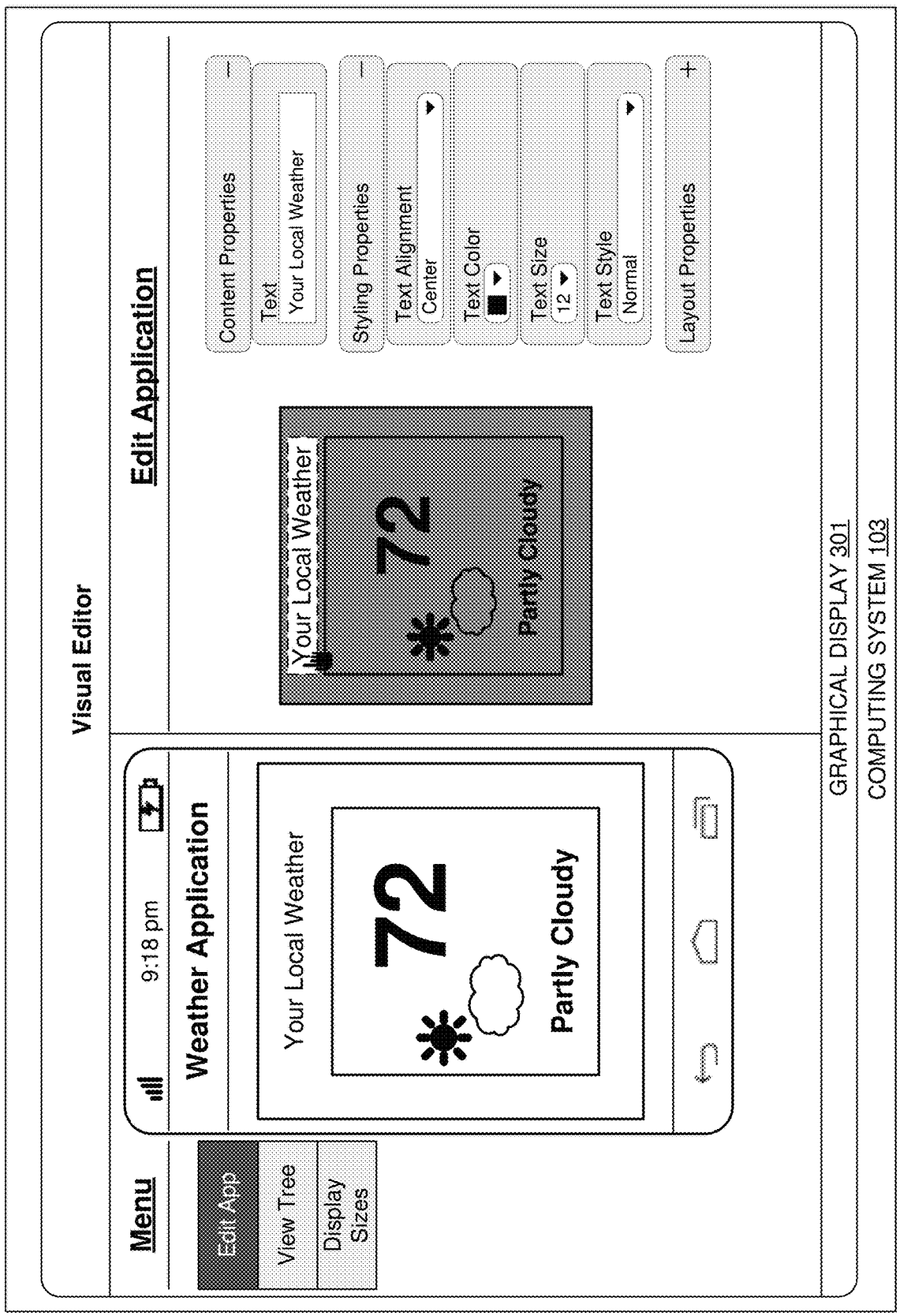
FIG. 3 illustrates an exemplary graphical display of an application on a computing system.
Figure 4:
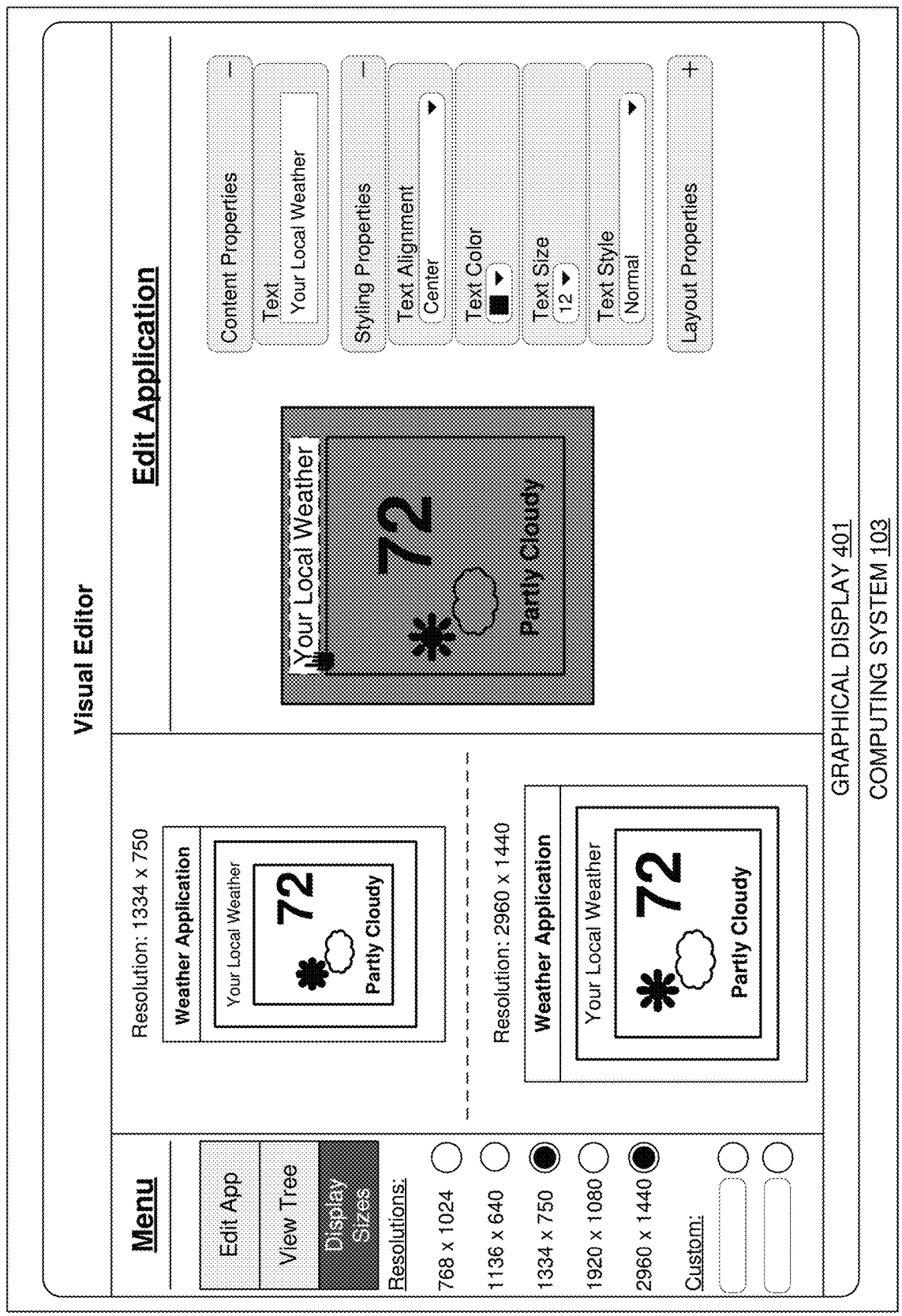
FIG. 4 illustrates an exemplary graphical display of an application on a computing system.
Figure 5:
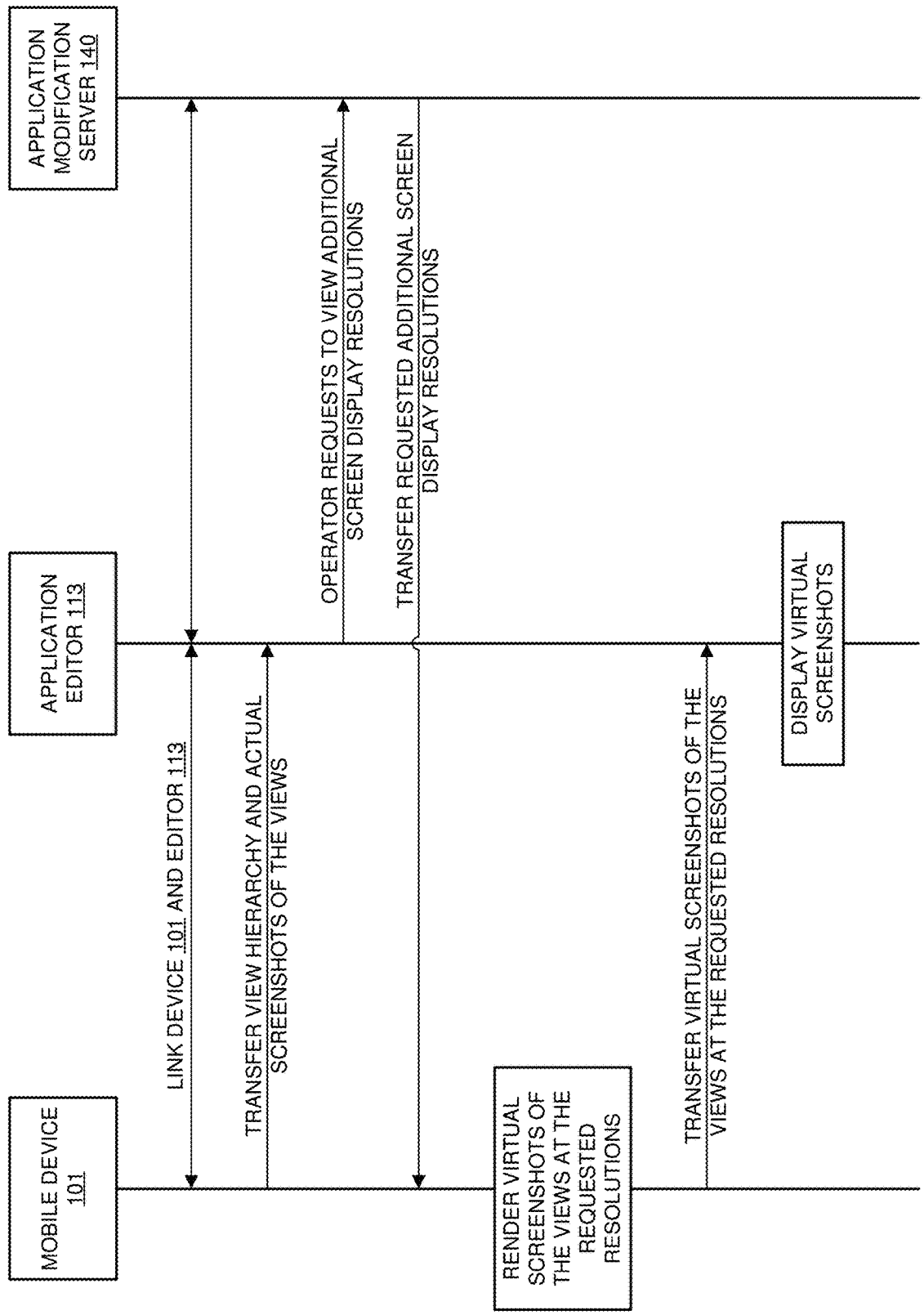
FIG. 5 is a sequence diagram that illustrates an operation of a communication system in an exemplary embodiment.
Figure 6:
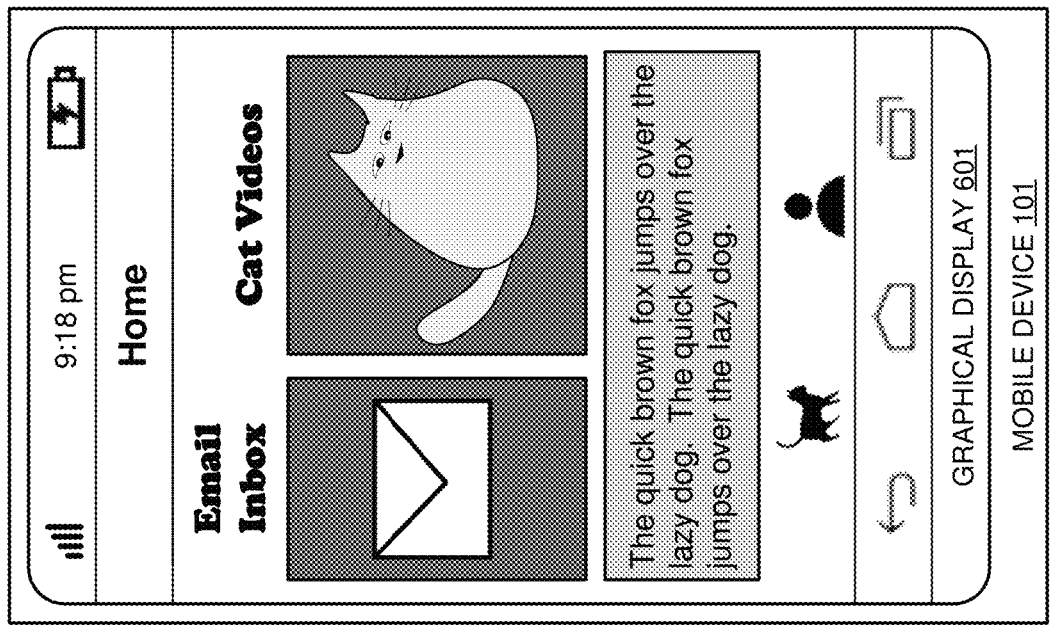
FIG. 6 illustrates an exemplary graphical display of an application on a mobile device.
Figure 7:
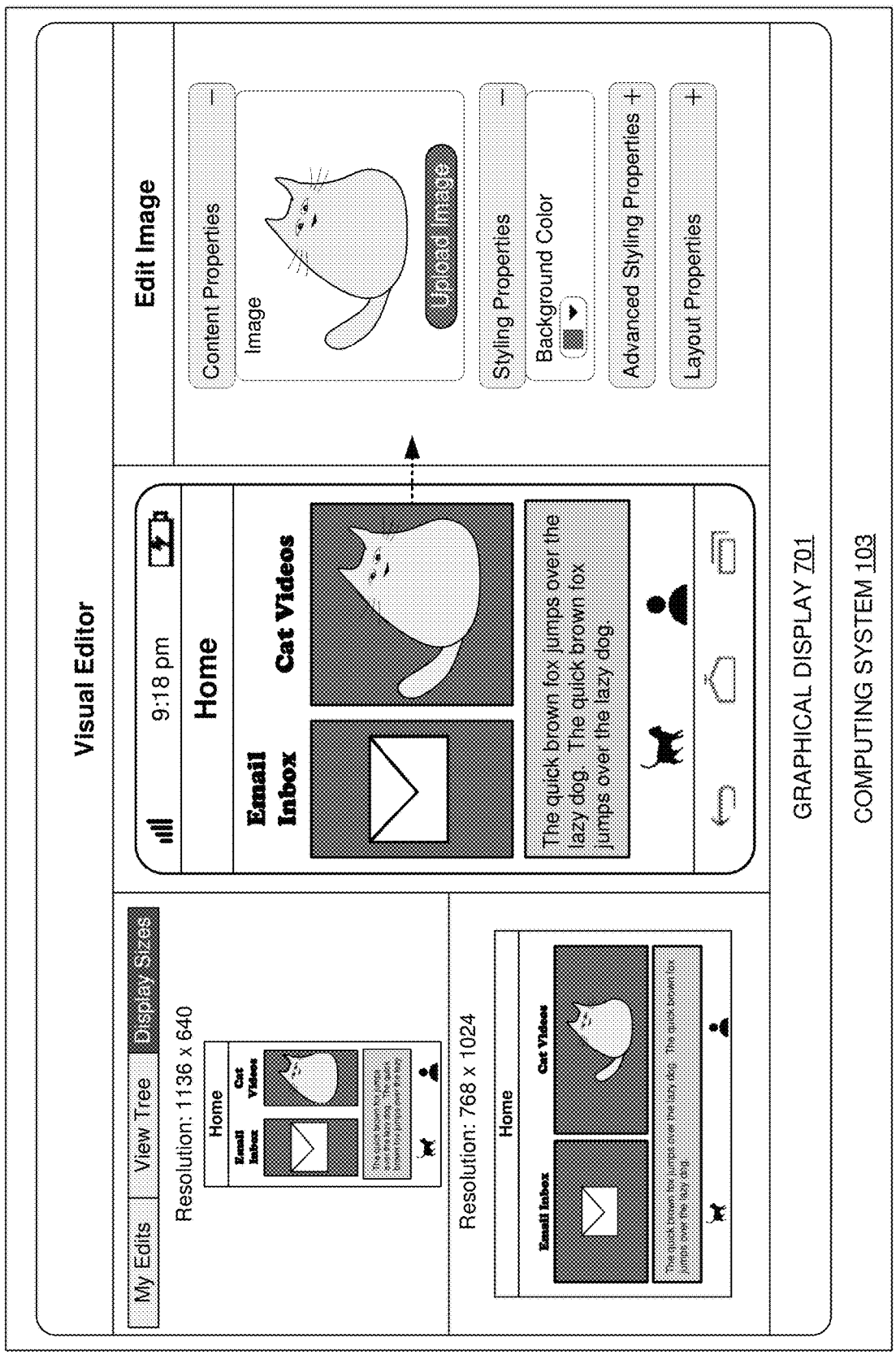
FIG. 7 illustrates an exemplary graphical display of an application on a computing system.
Figure 8:
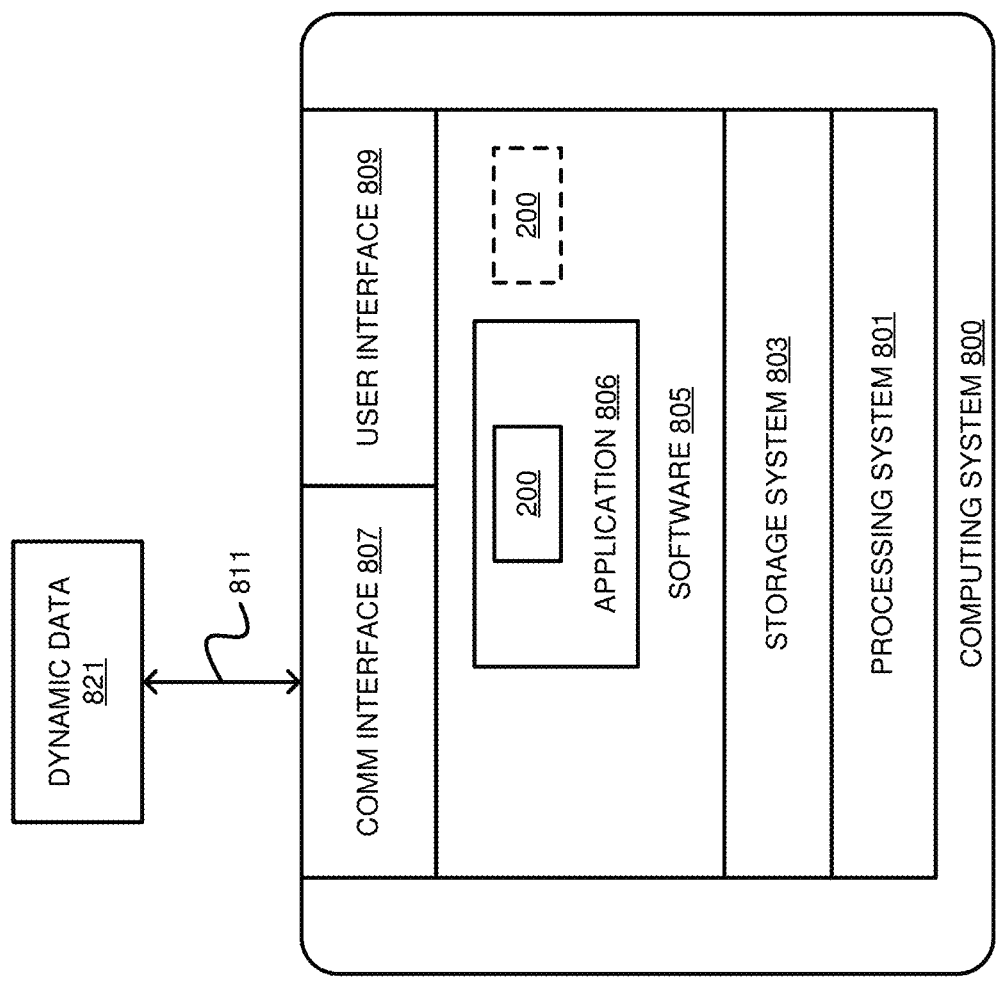
FIG. 8 is a block diagram that illustrates a computing system.

Referring now to the drawings, FIG. 1 illustrates a communication system that may be utilized to implement previewing modifications to visual elements of mobile applications at different display resolutions. FIG. 2 illustrates an operation of the communication system in an exemplary embodiment. FIGS. 3 and 4 illustrate exemplary graphical displays of a visual application editor executing on a computing system. FIG. 5 is a sequence diagram that illustrates another operation of the communication system in an exemplary embodiment. FIG. 6 illustrates an exemplary graphical display of a mobile application, while FIG. 7 illustrates an exemplary graphical display of a visual application editor executing on a computing system. FIG. 8 illustrates an exemplary computing system that may be used to perform any of the techniques, processes, and operational scenarios described herein.

Turning now to FIG. 1, a block diagram of communication system 100 is illustrated. Communication system 100 includes mobile device 101, computing system 103, communication network 130, and application modification server 140. Mobile device 101 includes operating system 120 and application 110. Application 110 runs on operating system 120. Mobile device 101 typically also includes a user interface that communicates with operating system 120 over a bus communication device. Application 110 comprises main program 111 and application modification software development kit (SDK) 112, which may be implemented as different software modules of application 110. Main program 111 comprises the primary program instructions for the functionality of the application, such as streaming video, social networking, email, instant messaging, weather, navigation, or any other mobile application. Application modification SDK 112 is typically installed into application 110 to facilitate changes and updates to a user interface and other visual elements of the application 110, perform A/B testing of different application design variants, provide actual and virtual screenshots of various views of application 110 for display on computing system 103, and other functionality. In some examples, application modification SDK 112 could comprise an embedded control module of application 110. Computing system 103 includes application editor 113. Computing system 103 may also include an operating system and user interface, although these components are not shown for clarity. Application modification server 140 comprises a computing system that provides an application development and optimization platform. In some examples, application editor 113 may comprise a web browser application that loads the application development and optimization platform provided by application modification server 140.

In operation, a developer of application 110 may execute application editor 113 on computing system 103 to operate an application management dashboard to apply real-time changes and updates to a user interface and other visual elements of the application 110, activate or deactivate features, perform A/B testing of different application design variants to determine how changes to application 110 affect user behavior, preview changes to mobile applications at different display resolutions, and other functionality. Typically, the developer would execute application 110 on mobile device 101 for use as a test device, and the execution of application 110 is then mirrored in the visual editor 113 executing on computing system 103. The mirrored execution of application 110 within application editor 113 is achieved by application modification SDK 112 transferring screenshots of the application 110 to computing system 103 for display within the editor 113, which typically communicate over web sockets. SDK 112 sends information about the user interface of application 110 to computing system 103 for display within application editor 113, including the entire view hierarchy of application 110, which comprises descriptions or labels of all views that exist in the current interface and screenshots of the views. In this manner, the screenshots of the views can be displayed as images on the screen within the visual application editor 113 and the view descriptions, labels, and any other information may be displayed in a tree structure or tree diagram that represents the view hierarchy structure in a graphical form. In addition, SDK 112 can also provide virtual screenshots at different screen sizes or resolutions than the actual screenshots displayed by mobile device 101. For example, an application developer executing application editor 113 on computing system 101 could request one or more virtual screenshots rendered at different resolutions than supported by the display screen of mobile device 101. SDK 112 could render each of the actual screenshots of the views into flat images and then resize these images into the specified resolutions to generate the requested virtual screenshots.

Once the visual application editor 113 receives and displays the view hierarchy of application 110, the developer can then click through the various views within the view hierarchy and make changes to different visual elements of the user interface. These changes are then sent to the application modification server 140 which can instantly update the display of application 110 with the changes in real time on mobile device 101 via communication with application modification SDK 112. Similarly, other application management functionality of the visual application editor 113 may be created and communicated to application modification server 140 and subsequently deployed to application 110 on mobile device 101 by communicating with SDK 112. In addition, the application developer can configure application editor 113 to display various different screen resolutions in a side panel or some other area of the user interface of editor 113, and the changes to the visual elements and display layout of mobile application 110 would then be shown simultaneously in real time at these different resolutions as well. Of course, any of the functionality described herein could be applied to numerous instances of application 110 installed on multitudes of user mobile devices which may affect some or all of the entire user base, but only one mobile device 101 is shown in FIG. 1 for clarity. An exemplary operation of communication system 100 will now be discussed with respect to FIG. 2.

FIG. 2 is a flow diagram that illustrates an operation of communication system 100 in an exemplary implementation. The operation 200 shown in FIG. 2 may also be referred to as display preview process 200 herein. The steps of the operation are indicated below parenthetically. The following discussion of operation 200 will proceed with reference to elements of communication system 100 of FIG. 1 in order to illustrate its operations, but note that the details provided in FIG. 1 are merely exemplary and not intended to limit the scope of process 200 to the specific implementation of FIG. 1.

Operation 200 may be employed by mobile device 101 to facilitate previewing changes to visual elements of mobile application 110 at different display sizes. As shown in the operational flow of FIG. 2, mobile device 101 receives screenshot capture instructions provided by an application development and optimization platform that indicate at least one requested display size at which to provide a view of mobile application 110 (201). In some examples, the screen capture instructions may be transmitted to mobile device 101 via computing system 103, application modification server 140, or any other device or system of the application development and optimization platform. The screen capture instructions may be defined by an owner of application 110 or some other administrator with access to the application development and optimization platform provided by application modification server 140 and application editor 113. For example, the application development and optimization platform may be configured to provide functionality for an operator to specify one or more display sizes to include in the screenshot capture instructions, which could include providing a list of display sizes from which the operator may select to include in the screenshot capture instructions. Additionally or alternatively, the operator may enter customized display sizes to include in the screenshot capture instructions. In this manner, an operator such as an application developer can utilize the application development and optimization platform to configure the screen capture instructions to specify one or more requested display sizes or screen resolutions for previewing changes to views of mobile application 110. In some examples, the screen capture instructions may be requested by mobile device 101 and pulled from the application development and optimization platform provided by application modification server 140, or could be pushed by server 140 automatically for delivery to mobile device 101. In at least one implementation, a control module embedded into application 110, such as application modification SDK 112 in this example, may query the application development and optimization platform provided by application modification server 140 for the screen capture instructions.

Mobile device 101 captures an actual screenshot of the view of mobile application 110 (202). For example, mobile device 101 may be configured to capture the actual screenshot of the view of mobile application 110 by capturing the actual screenshot at a display size of mobile device 101 on which mobile application 110 is executing. In some examples, along with the actual screenshot of the view, mobile device 101 could also capture information about a view hierarchy that describes the views that exist in a user interface of mobile application 110.

Mobile device 101 renders a virtual screenshot of the view by resizing the actual screenshot to the requested display size indicated in the screenshot capture instructions (203). For example, mobile device 101 may render the virtual screenshot of the view by rendering the actual screenshot of the view into a flattened image and resizing the flattened image to the requested display size indicated in the screenshot capture instructions. In at least one implementation, a control module embedded into application 110, such as application modification SDK 112 in this example, could be configured to render the virtual screenshot of the view by resizing the actual screenshot to the requested display size indicated in the screenshot capture instructions. Further, in some examples, mobile device 101 rendering the virtual screenshot of the view may involve directing the operating system 120 to render the view into a flattened image and then resizing the image to the specified display resolution at runtime. Other techniques of rendering the virtual screenshot of the view are possible and within the scope of this disclosure.

Mobile device 101 transfers the actual screenshot of the view and the virtual screenshot of the view rendered at the requested display size for delivery to the application development and optimization platform (204). In some examples, mobile device 101 may transfer updated actual and virtual screenshots of views in real time as updates to the views occur. Upon receipt of the screenshots, the application development and optimization platform may be configured to display the actual screenshot of the view and the virtual screenshot of the view rendered at the requested display size in a visual editor for mobile application 110. In some examples, in addition to transferring the actual and virtual screenshot of the view, mobile device 101 could also transfer information about a view hierarchy that describes the views that exist in a user interface of mobile application 110 for delivery to the application development and optimization platform. The actual and/or virtual snapshots of the views could then be displayed by the application development and optimization platform in relation to their arrangement in the view hierarchy.

Advantageously, mobile device 101 renders virtual screenshots at requested display sizes for views of a user interface of mobile application 110 and provides the virtual screenshots to an application development and optimization platform. In this manner, an application developer or other operator of a visual application editor 113 of the application development and optimization platform is able to preview how changes to visual elements of the user interface will look at different display resolutions. This technique provides the technical advantage of enabling the developer to see how the layout of visual elements on a user interface will look at various different display screen sizes directly from within editor 113, without having to test the application 110 on each of the different device types individually, thereby greatly facilitating rapid development and deployment of user interface changes. An exemplary implementation of visual editor 113 executing on computing system 103 for editing visual elements of mobile application 110 will now be discussed with respect to FIGS. 3 and 4.

FIG. 3 illustrates an exemplary graphical display 301 of application editor 113 executing on computing system 103. In this example, an application developer is executing application 110 on mobile device 101 as a test device (not shown), and the execution of application 110 is paired with application editor 113 executing on computing system 103. As shown in graphical display 301, the application developer is provided with a user interface of visual editor 113 which is divided vertically into two panes. At the top of the left-hand pane, a menu of buttons is provided to toggle between the Application Editor functionality with the "Edit App" selection, displaying the view hierarchy of application 110 in a tree structure by selecting "View Tree", and displaying the current view of the application in various different display resolutions by selecting "Display Sizes". To the right of the menu in the left-hand pane of graphical display 301, a mirrored view of application 110 executing on mobile device 101 at the native resolution of device 101 is presented, which is achieved by SDK 112 capturing screenshots of application 110 executing on mobile device 101 and sending the screenshots over web sockets to computing system 103 for display within visual application editor 113. Finally, the right-hand pane of graphical display 301 depicts an editor window for editing properties of visual elements of application 110.

In this example, the developer has accessed the "Edit Application" editor window to modify various visual properties of the weather application. As shown in FIG. 3, the application developer has selected the "Your Local Weather" heading for editing, as indicated by the dashed box surrounding the "Your Local Weather" text box and the small hand icon hovering over left-hand edge of this box. The remaining visual elements of the weather application are grayed out to indicate to the user that the "Your Local Weather" text box heading has been selected for editing. In this example, three different display properties are shown to the right of the application image on the application editor of graphical display 301, labeled "Content Properties", "Styling Properties", and "Layout Properties". The user can expand and contract these categories using the "plus" or "minus" icons appearing to the right of each of the property boxes. In this example, under "Content Properties", the text of the "Your Local Weather" heading can be changed. Under "Styling Properties", the text alignment, text color, text size, and text style can be modified. For example, the user could change the text alignment from "Center" to left or right justification, change the text color from black to any other color using the dropdown color swatch, change the font size, and change the font style from "Normal" to bold, italic, or the like. Finally, the user has the option to expand the "Layout Properties" to edit additional aspects of the visual layout.

Any changes made to the visual elements of the application could result in the layout and presentation of that view of the user interface to have a different appearance depending on the screen size or display resolution of the device that displays it. In order to avoid testing the application to see how visual changes will be presented on different display sizes of various device types, the visual editor 113 shown in graphical display 301 can display previews of the current view of the user interface at different display sizes by selecting the "Display Sizes" button from the menu. The effect of the user selecting the "Display Sizes" option will now be discussed with respect to FIG. 4.

Referring now to FIG. 4, an exemplary graphical display 401 of application editor 113 executing on computing system 103 is illustrated. In this example, the application developer has selected the "Display Sizes" option on the left-hand pane of graphical display 401 in order to display the current view of application 110 at various different display resolutions. In particular, the developer has configured visual editor 113 to display application 110 at resolutions of 1334 by 750 and 2960 by 1440 by selecting the radio buttons next to these values in the list of display resolutions as shown in graphical display 401. Accordingly, the developer can quickly see the effect of any changes made to the visual properties of the view currently being edited at the selected display sizes. In addition to the list of display resolutions shown in graphical display 401, the user can also enter customized display sizes of any desired ratio into the value boxes shown at the bottom of the "Display Sizes" menu. The operator is further able to toggle any of the desired display sizes on and off, which can save bandwidth and improve latency when fewer display resolutions are selected.

Beneficially, the developer is able to view the effect of any changes to the visual properties of application 110 at any desired screen resolutions. In the implementation shown in FIG. 4, the left-hand panel of graphical display 401 includes a customizable list of all other screen resolutions for various different device types, and the user is able scroll through and select them all collectively or individually to see the display updated in real time for a preview of what the current application display view will look like on each of these device types. In at least one implementation, the SDK 112 installed into the application 110 communicates with the visual application editor 113 to identify which resolutions are currently selected by the user in real time, and then directs the operating system 120 to render the current view of application 110 into a flat image and resize the image to the selected resolutions at runtime to generate the virtual screenshots. The SDK 112 then directs mobile device 101 to transfer the virtual screenshots that are resized to the selected resolutions for delivery to computing system 103 for display within application editor 113. In this manner, the developer can view the effect of any changes to visual elements and the display layout of application 110 at the selected resolutions in real time when using visual application editor 113, thereby eliminating the need to test each device type individually to see what the changes will look like at the different display resolutions supported by each type of device. Another exemplary operation of communication system 100 will now be discussed with respect to FIG. 5.

FIG. 5 is a sequence diagram that illustrates an operation of communication system 100 in an exemplary implementation. In this example, an application developer is executing application 110 on mobile device 101 as a test device, and the execution of application 110 is linked with application editor 113 executing on computing system 103. The execution of application 110 on the test device 101 is effectively mirrored into the application editor window 113 on the application developer's computing system 103. Communicating over web sockets, the SDK 112 that is installed into application 110 executing on device 101 sends information about the entire view hierarchy of the user interface to computing system 103 for display within application editor 113, including all the views that exist in the current interface and actual screenshots of the views. Accordingly, the visual editor 113 displays the view hierarchy of application 110 received from device 101, which may be represented in a tree format on the left margin of the editor screen so that the operator can click through elements within the view hierarchy and display the screenshot images of the various views.

Subsequently, the developer of application 110 requests to view additional screen display resolutions other than the native resolution of mobile device 101. This may be achieved by the developer selecting various different display resolutions from a list of display sizes available within editor 113, manually entering any custom display sizes desired, or any other manner of selecting one or more alternative display resolutions. The operator's request to view additional display resolutions is transferred by the application editor 113 via computing system 103 to application modification server 140, which responsively transfers the requested display resolutions to mobile device 101. SDK 112 receives and processes the requested display resolution sizes and renders virtual screenshots of the views at the requested resolutions. In at least one implementation, SDK 112 may accomplish this by driving the operating system 120 of mobile device 101 to render the actual screenshots of the different views into flattened images and then resize these images to the specified resolutions at runtime. Once the virtual screenshots have been rendered, the virtual screenshots of the views at the requested resolutions are transferred by mobile device 101 to computing system 103 for display within visual editor 113. The editor 113 then displays the requested virtual screenshots at the specified display sizes, thereby enabling the application developer to quickly preview what the current view of the application user interface will look like on the display screens of their associated device types. A graphical representation of an exemplary operational scenario involving mobile device 101 and computing system 103 to preview modifications to visual elements of mobile application 110 at different display resolutions will now be described with respect to FIGS. 6 and 7.

FIG. 6 illustrates exemplary graphical display 601 of application 110 executing on mobile device 101. In this example, graphical display 601 displays a home screen of application 110. The home screen provides the user with a link to access an email inbox along with a picture of a letter, a link to access cat videos along with a picture of a cat, and a text box displaying the sentence "the quick brown fox jumps over the lazy dog" repeated two times. Below the text box are two icons representing a cat and a person. In operation, a developer of application 110 would install application modification SDK 112 into application 110 and then execute application 110 on mobile device 101. SDK 112 would then transfer screenshots of the various views of application 110 for delivery to application editor 113 executing on computing system 103, including any desired virtual screenshots at different screen sizes than the actual screenshots of mobile device 101. A technique to generate and provide these virtual screenshots at different display resolutions to application editor 113 to enable the developer to preview changes to visual elements of application 110 at these different resolutions will now be described with respect to FIG. 7.

Referring now to FIG. 7, an exemplary graphical display 701 of application editor 113 executing on computing system 103 is illustrated. In this example, an application developer is executing application 110 on mobile device 101 as a test device (not shown), and the execution of application 110 is paired with application editor 113 executing on computing system 103. As shown in graphical display 701, the application developer is provided with a user interface of visual editor 113 which is divided vertically into three panes. At the top of the left-hand pane, buttons are provided to toggle between displaying "My Edits", displaying the view hierarchy of application 110 in a tree structure by selecting "View Tree", and displaying the current view of the application in various different display resolutions by selecting "Display Sizes". In the center pane, graphical display 701 provides a mirrored view of application 110 executing on mobile device 101 at the native resolution of device 101, which is achieved by SDK 112 capturing screenshots of application 110 executing on mobile device 101 and sending the screenshots over web sockets to computing system 103 for display within visual application editor 113 as shown in graphical display 701. Finally, the right-hand pane of graphical display 701 shows an editor window for editing properties of visual elements of application 110.

In this example, the developer has accessed the "Edit Image" editor window to modify various properties of the cat image appearing below the "Cat Videos" link on the home screen of mobile application 110. As shown in FIG. 7, the image editor window provides the ability to change the content properties by uploading a different image, edit the styling properties by changing the background color, and edit advanced styling properties or layout properties. In addition, the application developer has also selected the "Display Sizes" option on the left-hand pane of graphical display 701 in order to display the current view of application 110 at various different resolutions. In particular, the developer has configured visual editor 113 to display application 110 at resolutions of 1136 by 640 and 768 by 1024. Accordingly, the developer can quickly see that although the image of the cat displays properly at the native resolution of mobile device 101 as shown by the actual screenshots displayed in the center pane of graphical display 701, the image of the cat is cropped when displayed at a resolution of 1136 by 640, resulting in the tail of the cat no longer being visible. The space allocated for the image of the letter displayed under the "Email Inbox" link is also barely wide enough to accommodate the image at this resolution. Further, the space allocated for the text box causes the text to take up four lines instead of three, resulting in the last word of the second sentence, "dog", to no longer appear in the text box. However, in the lower portion of the left-hand pane of graphical display 701 showing the display resolution of 768 by 1024, the wider display allows for much wider image window borders around the images of the letter and the cat, and the wider space provided for the text box causes the text to only take up two lines.

Advantageously, the developer is able to view the effect of any changes to the visual properties of application 110 at any desired screen resolutions. In at least one implementation, the left-hand panel of graphical display 701 that shows the various device sizes could include a customizable list of all other screen resolutions for various different device types, and the user could scroll through and select them all individually to see the display updated in real time for a preview of what the current application display view will look like on each of these device types. In some examples, the user may be presented with the option to toggle each of the display resolutions on or off in order to select which views are displayed in order to reduce latency and bandwidth usage. In operation, the SDK 112 installed into the application 110 communicates with the visual application editor 113 to identify which resolutions are currently selected by the user in real time, and then directs the operating system 120 to render the current view of application 110 into a flat image and then resize the image to the selected resolutions at runtime to generate the virtual screenshots. The SDK 112 then directs mobile device 101 to transfer the virtual screenshots that are resized to the selected resolutions for delivery to computing system 103 for display within application editor 113. In this manner, the developer can view the effect of any changes to visual elements and the display layout of application 110 at the selected resolutions in real time when using visual application editor 113, thereby eliminating the need to test each device type individually to see what the changes will look like at the different display resolutions supported by each type of device.

Now referring back to FIG. 1, mobile device 101 comprises a processing system and communication transceiver. Mobile device 101 may also include other components such as a user interface, data storage system, and power supply. Mobile device 101 may reside in a single device or may be distributed across multiple devices. Examples of mobile device 101 include mobile computing devices, such as cell phones, tablet computers, laptop computers, notebook computers, and gaming devices, as well as any other type of mobile computing devices and any combination or variation thereof. Examples of mobile device 101 may also include desktop computers, server computers, and virtual machines, as well as any other type of computing system, variation, or combination thereof.

Computing system 103 comprises a processing system and communication transceiver. Computing system 103 may also include other components such as a user interface, data storage system, and power supply. Computing system 103 may reside in a single device or may be distributed across multiple devices. Examples of computing system 103 include mobile computing devices, such as cell phones, tablet computers, laptop computers, notebook computers, and gaming devices, as well as any other type of mobile computing devices and any combination or variation thereof. Examples of computing system 103 also include desktop computers, server computers, and virtual machines, as well as any other type of computing system, variation, or combination thereof.

Communication network 130 could comprise multiple network elements such as routers, gateways, telecommunication switches, servers, processing systems, or other communication equipment and systems for providing communication and data services. In some examples, communication network 130 could comprise wireless communication nodes, telephony switches, Internet routers, network gateways, computer systems, communication links, or some other type of communication equipment, including combinations thereof. Communication network 130 may also comprise optical networks, packet networks, local area networks (LAN), metropolitan area networks (MAN), wide area networks (WAN), or other network topologies, equipment, or systems—including combinations thereof. Communication network 130 may be configured to communicate over metallic, wireless, or optical links. Communication network 130 may be configured to use time-division multiplexing (TDM), Internet Protocol (IP), Ethernet, optical networking, wireless protocols, communication signaling, or some other communication format, including combinations thereof. In some examples, communication network 130 includes further access nodes and associated equipment for providing communication services to several computer systems across a large geographic region.

Application modification server 140 may be representative of any computing apparatus, system, or systems that may connect to another computing system over a communication network. Application modification server 140 comprises a processing system and communication transceiver. Application modification server 140 may also include other components such as a router, server, data storage system, and power supply. Application modification server 140 may reside in a single device or may be distributed across multiple devices. Application modification server 140 may be a discrete system or may be integrated within other systems, including other systems within communication system 100. Some examples of application modification server 140 include desktop computers, server computers, cloud computing platforms, and virtual machines, as well as any other type of computing system, variation, or combination thereof.

Referring now to FIG. 8, a block diagram that illustrates computing system 800 in an exemplary implementation is shown. Computing system 800 provides an example of mobile device 101, computing system 103, application modification server 140, or any computing system that may be used to execute display preview process 200 or variations thereof, although such systems could use alternative configurations. Computing system 800 includes processing system 801, storage system 803, software 805, communication interface 807, and user interface 809. Software 805 includes application 806 which itself includes display preview process 200. Display preview process 200 may optionally be implemented separately from application 806 as indicated by the dashed lines surrounding process 200 in FIG. 8.

Computing system 800 may be representative of any computing apparatus, system, or systems on which application 806 and display preview process 200 or variations thereof may be suitably implemented. Computing system 800 may reside in a single device or may be distributed across multiple devices. Examples of computing system 800 include mobile computing devices, such as cell phones, tablet computers, laptop computers, notebook computers, and gaming devices, as well as any other type of mobile computing devices and any combination or variation thereof. Note that the features and functionality of computing system 800 may apply as well to desktop computers, server computers, and virtual machines, as well as any other type of computing system, variation, or combination thereof.

Computing system 800 includes processing system 801, storage system 803, software 805, communication interface 807, and user interface 809. Processing system 801 is operatively coupled with storage system 803, communication interface 807, and user interface 809. Processing system 801 loads and executes software 805 from storage system 803. When executed by computing system 800 in general, and processing system 801 in particular, software 805 directs computing system 800 to operate as described herein for each implementation or variations thereof. Computing system 800 may optionally include additional devices, features, or functionality not discussed herein for purposes of brevity.

Referring still to FIG. 8, processing system 801 may comprise a microprocessor and other circuitry that retrieves and executes software 805 from storage system 803. Processing system 801 may be implemented within a single processing device but may also be distributed across multiple processing devices or sub-systems that cooperate in executing program instructions. Examples of processing system 801 include general purpose central processing units, application specific processors, and logic devices, as well as any other type of processing device, combinations, or variations thereof.

Storage system 803 may comprise any computer-readable storage media capable of storing software 805 and readable by processing system 801. Storage system 803 may include volatile and nonvolatile, removable and non-removable media implemented in any method or technology for storage of information, such as computer readable instructions, data structures, program modules, or other data. Storage system 803 may be implemented as a single storage device but may also be implemented across multiple storage devices or sub-systems co-located or distributed relative to each other. Storage system 803 may comprise additional elements, such as a controller, capable of communicating with processing system 801. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 809, processing system 801 loads and executes portions of software 805, such as display preview process 200, to facilitate previewing changes to visual elements of a mobile application at different display sizes as described herein. Software 805 may be implemented in program instructions and among other functions may, when executed by computing system 800 in general or processing system 801 in particular, direct computing system 800 or processing system 801 to receive screenshot capture instructions provided by an application development and optimization platform that indicate at least one requested display size at which to provide a view of the mobile application. Software 805 may further direct computing system 800 or processing system 801 to capture an actual screenshot of the view of the mobile application. Software 805 may also direct computing system 800 or processing system 801 to render a virtual screenshot of the view by resizing the actual screenshot to the requested display size indicated in the screenshot capture instructions. In addition, software 805 may direct computing system 800 or processing system 801 to transfer the actual screenshot of the view and the virtual screenshot of the view rendered at the requested display size for delivery to the application development and optimization platform.

Software 805 may include additional processes, programs, or components, such as operating system software or other application software. Examples of operating systems include Windows®, iOS®, and Android®, as well as any other suitable operating system. Software 805 may also comprise firmware or some other form of machine-readable processing instructions executable by processing system 801.

In general, software 805 may, when loaded into processing system 801 and executed, transform computing system 800 overall from a general-purpose computing system into a special-purpose computing system customized to facilitate previewing changes to visual elements of a mobile application at different display sizes as described herein for each implementation or variations thereof. For example, encoding software 805 on storage system 803 may transform the physical structure of storage system 803. The specific transformation of the physical structure may depend on various factors in different implementations of this description. Examples of such factors may include, but are not limited to the technology used to implement the storage media of storage system 803 and whether the computer-readable storage media are characterized as primary or secondary storage.

In some examples, if the computer-readable storage media are implemented as semiconductor-based memory, software 805 may transform the physical state of the semiconductor memory when the program is encoded therein. For example, software 805 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 800 is generally intended to represent a computing system with which software 805 is deployed and executed in order to implement application 806 and/or display preview process 200 to operate as described herein for each implementation (and variations thereof). However, computing system 800 may also represent any computing system on which software 805 may be staged and from where software 805 may be distributed, transported, downloaded, or otherwise provided to yet another computing system for deployment and execution, or yet additional distribution. For example, computing system 800 could be configured to deploy software 805 over the internet to one or more client computing systems for execution thereon, such as in a cloud-based deployment scenario.

Communication interface 807 may include communication connections and devices that allow for communication between computing system 800 and other computing systems (not shown) or services, over a communication network 811 or collection of networks. In some implementations, communication interface 807 receives dynamic data 821 over communication network 811. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 809 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 809. In some examples, user interface 809 could include a touch screen capable of displaying a graphical user interface that also accepts user inputs via touches on its surface. The aforementioned user input devices are well known in the art and need not be discussed at length here. User interface 809 may also include associated user interface software executable by processing system 801 in support of the various user input and output devices discussed above. Separately or in conjunction with each other and other hardware and software elements, the user interface software and devices may provide a graphical user interface, a natural user interface, or any other kind of user interface. User interface 809 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate testing changes to visual elements of a mobile application at different display sizes, the method comprising:
executing an application editor program on a mobile device:
receiving screenshot capture instructions provided by the application editor program that indicates at least one requested display size at which to provide a view of the mobile application,
the at least one requested display size being different from a native resolution of the mobile device executing the application editor program:
capturing an actual screenshot of the view of the mobile application;
rendering a virtual screenshot of the view by resizing the actual screenshot to the requested display size indicated in the screenshot capture instructions; and
wherein the application editor program is configured to provide functionality for an operator to specify one or more display sizes to include in the screenshot capture instructions;
transferring the actual screenshot of the view and the virtual screenshot of the view rendered at the requested display size for delivery to the application editor program, the application editor program;
displaying the actual screenshot of the view and the virtual screenshot of the view rendered at the requested display size, the virtual screenshot displaying a change in space allocated for at least one visual element compared to the actual screenshot.

2. The method of claim 1 wherein transferring the actual screenshot of the view and the virtual screenshot of the view rendered at the requested display size for delivery to the application editor program comprises transferring information about a view hierarchy that describes views that exist in a user interface of the mobile application.

3. The method of claim 1 wherein rendering the virtual screenshot of the view by resizing the actual screenshot to the requested display size indicated in the screenshot capture instructions comprises rendering the actual screenshot of the view into a flattened image and resizing the flattened image to the requested display size indicated in the screenshot capture instructions.

4. The method of claim 1 wherein the functionality for the operator to specify the one or more display sizes comprises providing a list of the display sizes from which the operator may select to include in the screenshot capture instructions.

5. The method of claim 1 wherein capturing the actual screenshot of the view of the mobile application comprises capturing the actual screenshot at a display size of a device on which the mobile application is executing.

6. One or more non-transitory computer-readable storage media having program instructions stored thereon to facilitate testing changes to visual elements of a mobile application at different display sizes, wherein the program instructions, when executed by a computing system, direct the computing system to at least:
execute an application editor program on a mobile device:
receive screenshot capture instructions provided by the application editor program that indicates at least one requested display size at which to provide a view of the mobile application, the at least one requested display size being different from a native resolution of the mobile device executing the application editor program:
capture an actual screenshot of the view of the mobile application;
render a virtual screenshot of the view by resizing the actual screenshot to the requested display size indicated in the screenshot capture instructions; and
wherein the application editor program is configured to provide functionality for an operator to specify one or more display sizes to include in the screenshot capture instructions;
transfer the actual screenshot of the view and the virtual screenshot of the view rendered at the requested display size for delivery to the application editor program, the application editor program;
displaying the actual screenshot of the view and the virtual screenshot of the view rendered at the requested display size, the virtual screenshot displaying a change in space allocated for at least one visual element compared to the actual screenshot.

7. The one or more computer-readable storage media of claim 6 wherein the program instructions direct the computing system to transfer the actual screenshot of the view and the virtual screenshot of the view rendered at the requested display size for delivery to the application editor program by directing the computing system to transfer information about a view hierarchy that describes views that exist in a user interface of the mobile application.

8. The one or more computer-readable storage media of claim 6 wherein the program instructions direct the computing system to render the virtual screenshot of the view by directing the computing system to render the actual screenshot of the view into a flattened image and resize the flattened image to the requested display size indicated in the screenshot capture instructions.

9. The one or more computer-readable storage media of claim 6 wherein the functionality for the operator to specify the one or more display sizes comprises providing a list of the display sizes from which the operator may select to include in the screenshot capture instructions.

10. The one or more computer-readable storage media of claim 6 wherein the program instructions direct the computing system to capture the actual screenshot of the view of the mobile application by directing the computing system to capture the actual screenshot at a display size of the computing system on which the mobile application is executing.

11. A computing apparatus comprising: one or more computer-readable storage media;
a processing system operatively coupled with the one or more computer-readable storage media; and
a mobile application stored on the one or more computer-readable storage media and including an embedded control module comprising program instructions that, when executed by the processing system, direct the processing system to at least:
execute an application editor program on a mobile device;
receive screenshot capture instructions provided by the application editor program that indicates at least one requested display size at which to provide a view of the mobile application, the at least one requested display size being different from a native resolution of the mobile device executing the application editor program;
capture an actual screenshot of the view of the mobile application;
render a virtual screenshot of the view by resizing the actual screenshot to the requested display size indicated in the screenshot capture instructions; and wherein the application editor program is configured to provide functionality for an operator to specify one or more display sizes to include in the screenshot capture instructions;

transfer the actual screenshot of the view and the virtual screenshot of the view rendered at the requested display size for delivery to the application editor program, the application editor program;

displaying the actual screenshot of the view and the virtual screenshot of the view rendered at the requested display size, the virtual screenshot displaying a change in space allocated for at least one visual element compared to the actual screenshot.

12. The computing apparatus of claim 11 wherein the program instructions direct the processing system to transfer the actual screenshot of the view and the virtual screenshot of the view rendered at the requested display size for delivery to the application editor program by directing the processing system to transfer information about a view hierarchy that describes views that exist in a user interface of the mobile application.

13. The computing apparatus of claim 11 wherein the program instructions direct the processing system to render the virtual screenshot of the view by directing the processing system to render the actual screenshot of the view into a flattened image and resize the flattened image to the requested display size indicated in the screenshot capture instructions.

14. The computing apparatus of claim 11 wherein the functionality for the operator to specify the one or more display sizes comprises providing a list of the display sizes from which the operator may select to include in the screenshot capture instructions.

* * * * *